(12) United States Patent
Han et al.

(10) Patent No.: US 8,330,442 B2
(45) Date of Patent: Dec. 11, 2012

(54) DC TO DC CONVERTER AND METHOD FOR REDUCING OVERSHOOT

(75) Inventors: Wei Han, Taipei (TW); Ching-Ji Liang, Taipei (TW); Tao Liu, Taipei (TW)

(73) Assignee: Asus Technology Pte Ltd., Eightrium (SG)

( * ) Notice: Subject to any disclaimer, the term of this patent is extended or adjusted under 35 U.S.C. 154(b) by 388 days.

(21) Appl. No.: 12/710,860

(22) Filed: Feb. 23, 2010

(65) Prior Publication Data

US 2010/0219803 A1 Sep. 2, 2010

(30) Foreign Application Priority Data

Feb. 27, 2009 (TW) .............................. 98106407 A

(51) Int. Cl.
*G05F 1/40* (2006.01)

(52) U.S. Cl. ...................................................... 323/282

(58) Field of Classification Search .................. 323/273, 323/274, 282, 284, 351
See application file for complete search history.

(56) References Cited

U.S. PATENT DOCUMENTS

| | | | |
|---|---|---|---|
| 6,137,275 A | 10/2000 | Ravon | |
| 6,204,649 B1 * | 3/2001 | Roman | 323/282 |
| 7,157,943 B2 | 1/2007 | Sanzo | |
| 7,755,584 B2 * | 7/2010 | Senda et al. | 345/87 |
| 7,834,604 B2 * | 11/2010 | Soenen et al. | 323/282 |
| 7,898,236 B2 * | 3/2011 | Houston et al. | 323/284 |
| 8,125,207 B2 * | 2/2012 | Houston et al. | 323/284 |
| 2005/0052887 A1 | 3/2005 | Matsuo et al. | |
| 2007/0024260 A1 | 2/2007 | Matsuo et al. | |
| 2008/0224674 A1* | 9/2008 | Hasegawa | 323/271 |

FOREIGN PATENT DOCUMENTS

| | | |
|---|---|---|
| CN | 1592060 A | 3/2005 |
| CN | 1780131 A | 5/2006 |
| CN | 101262174 A | 9/2008 |
| JP | 2001095245 A | 4/2001 |

* cited by examiner

*Primary Examiner* — Adolf Berhane
(74) *Attorney, Agent, or Firm* — Jianq Chyun IP Office

(57) ABSTRACT

A DC to DC converter includes a control circuit, a gate driver circuit, and a power stage circuit. The control circuit receives and compares a DC output voltage. When the DC output voltage lower than a first threshold voltage, a PWM signal with a first frequency is outputted, and when the DC output voltage higher than the first threshold voltage, the PWM signal with a second frequency is outputted. The second frequency is higher than the first frequency. The gate driver circuit receives the PWM signal and converts the PWM signal to a first driving signal and a second driving signal. The power stage circuit converts a DC input voltage to the DC output voltage according to the first driving signal and the second driving signal.

9 Claims, 18 Drawing Sheets

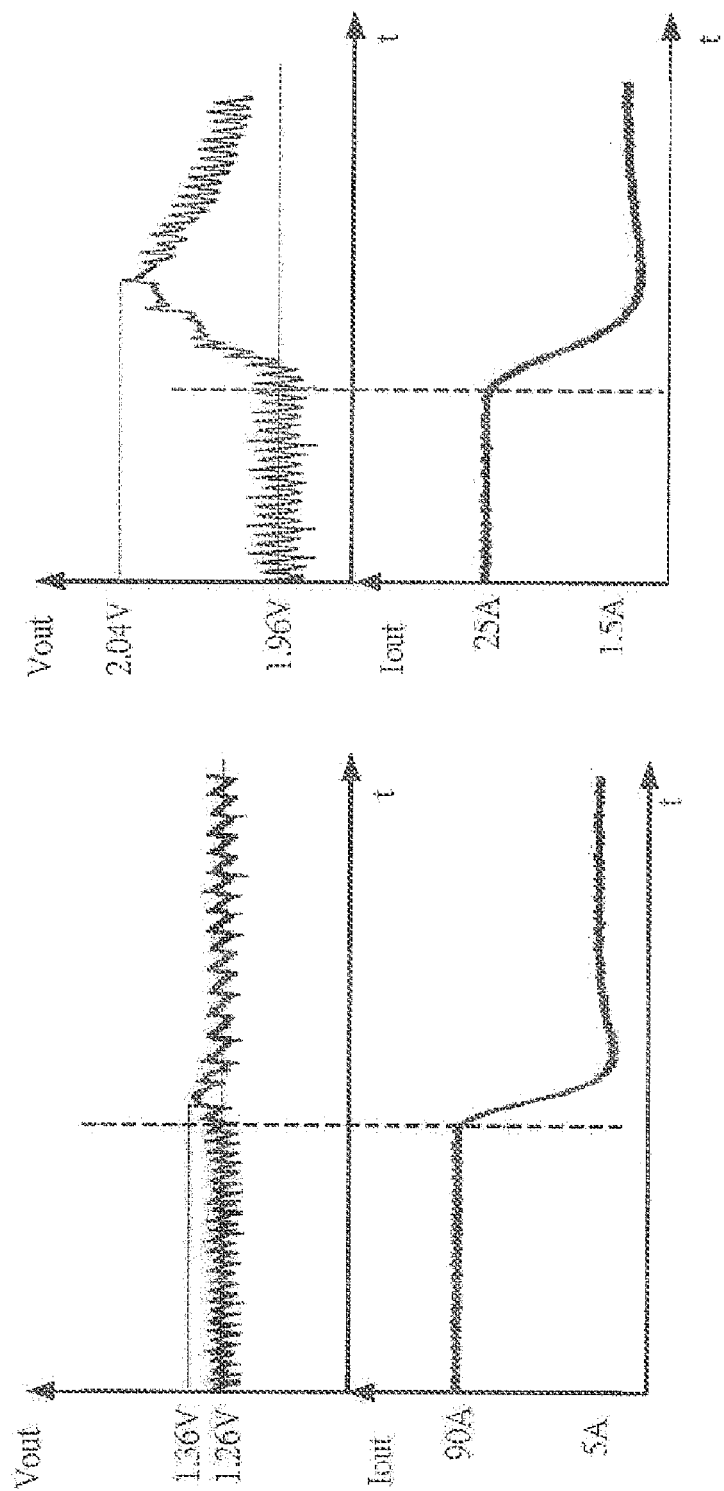

DC TO DC CONVERTER AND METHOD FOR REDUCING OVERSHOOT

FIELD OF THE INVENTION

The invention discloses a direct current (DC) to DC converter and, more particularly, to a DC to DC converter and a control method for reducing an overshoot thereof.

BACKGROUND OF THE INVENTION

As everyone knows, a DC to DC converter may convert a DC input voltage to a DC output voltage with a different value.

FIG. 1 is a schematic diagram showing a conventional DC to DC converter. The DC to DC converter includes a control circuit 10, a gate driver circuit 20 and a power stage circuit 30. Generally, the control circuit 10 may receive a DC output voltage (Vout) generated by the power stage circuit 30 and generate a corresponding pulse width modulation (PWM) signal according to the change of the DC output voltage (Vout). In addition, the gate driver circuit 20 receives the PWM signal and converts the PWM signal to a first driving signal and a second driving signal to the power stage circuit 30, and the power stage circuit 30 may convert a DC input voltage (Vin) to the DC output voltage (Vout) according to the change of the first driving signal and the change of the second driving signal.

In addition, the gate driver circuit 20 includes a first driver 22 and a second driver 24. The first driver 22 receives the PWM signal and generates the first driving signal having the same phase as the PWM signal. The second driver 24 receives the PWM signal and generates the second driving signal having a phase opposite to that of the PWM signal.

In addition, the power stage circuit 30 includes an upper power transistor 32, a lower power transistor 34, an output inductor (Lo) and an output capacitor (Co). The drain of the upper power transistor 32 is connected to the DC input voltage (Vin), and the gate of the upper power transistor 32 receives the first driving signal. The drain of the lower power transistor 34 is connected to the source of the upper power transistor 32, the gate of the lower power transistor 34 receives the second driving signal, and the source of the lower power transistor 34 is connected to the ground (GND). A first terminal of the output inductor (Lo) is connected to source of the upper power transistor 32, and a second terminal of the output inductor (Lo) is an output terminal of the power stage circuit 30, which may output the DC output voltage (Vout). In addition, the two terminals of the output capacitor (Co) are connected between the output terminal and the ground terminal (GND) of the power stage circuit 30, respectively. Generally, when the DC input voltage (Vin) is higher than the DC output voltage (Vout); the DC to DC converter may be considered as a buck DC to DC converter.

When the DC to DC converter is a buck DC to DC converter, the first driving signal and the second driving signal generated by the gate driver circuit 20 may turn on the upper power transistor 32 and the lower power transistor 34, respectively. The upper power transistor 32 and the lower power transistor 34 cannot be turned on at the same time. That is, when the upper power transistor 32 is turned on, the lower power transistor 34 is turned off. At that moment, the second current (I2) is zero, and the output current (Iout) of the power stage circuit 30 is provided by the first current (I1) generated by turning on the upper power transistor 32. On the contrary, when the lower power transistor 34 is turned on, the upper power transistor 32 is turned off. At that moment, the first current (I1) is zero, and the output current (Iout) of the power stage circuit 30 is provided by the second current (I2) generated by turning on the lower power transistor 34. Generally, when the DC output voltage (Vout) received by the control circuit 10 is lower than a predetermined value (such as 3.3V); the pulse width of the PWM signal becomes wider. Thus, the first driving signal generated by the gate driver circuit 20 may control the upper power transistor 32 to be turned on for a longer time, and the second driving signal controls the lower power transistor 34 to be turned off for a longer time. On the contrary, when the DC output voltage (Vout) received by the control circuit 10 is higher than the predetermined value (such as 3.3V); the pulse width of the PWM signal becomes narrower. Thus, the first driving signal generated by the gate driver circuit 20 may control the upper power transistor 32 to be turned on for a shorter time, and the second driving signal may control the lower power transistor 34 to be turned off for a shorter time.

In addition, the control circuit 10 of the DC to DC converter has multiple control modes. A voltage mode, a current mode and a constant on-time mode are common control modes. The three control modes are illustrated in detail hereinafter, the structures of the gate driver circuit 20 and the power stage circuit 30 in the three modes are the same, and they are not illustrated for a concise purpose.

FIG. 2A is a schematic diagram showing the conventional DC to DC converter in the voltage mode. The DC to DC converter of the voltage mode includes a control circuit 210, a gate driver circuit 220 and a power stage circuit 230. The control circuit 210 includes an error amplifier 212, a modulator 214, and a signal generator 216. The error amplifier 212 receives the DC output voltage (Vout) and a reference voltage (Vref), and the error amplifier 212 may compare the DC output voltage (Vout) with the reference voltage (Vref) to generate a compensation signal (comp) to the modulator 214.

In addition, the signal generator 216 may output a sawtooth waveform signal (ramp) with a first frequency to the modulator 214 to make the modulator 214 generate the PWM signal according to the compensation signal (comp) and the sawtooth waveform signal (ramp). Besides the sawtooth waveform signal (ramp), the signal generator 216 also may output signals having other forms such as a triangle waveform signal.

FIG. 2B is a schematic diagram showing the compensation signal (comp), the sawtooth waveform signal (ramp), the PWM signal, the first driving signal, and the second driving signal in the voltage mode. When the compensation signal (comp) is stronger than the sawtooth waveform signal (ramp), the PWM signal is in a high level. On the contrary, when the compensation signal (comp) is weaker than the sawtooth waveform signal (ramp), the PWM signal is in the lower level. Obviously, when the compensation signal (comp) changes, the pulse width of the PWM signal changes therewith. Furthermore, the first driving signal and the PWM signal have the same phase, and the second driving signal and the PWM signal have opposite phases. The frequency of the PWM signal and the frequency of the sawtooth waveform signal (ramp) are the first frequency.

FIG. 3A is a schematic diagram showing the conventional DC to DC converter in the current mode. The DC to DC converter in the current mode includes a control circuit 310, a gate driver circuit 320 and a power stage circuit 330. The control circuit 310 includes an error amplifier 312, a PWM comparator 313, a signal generator 314, a current sensing amplifier 315, an adder 316, and a set-reset (SR) latch 317. The error amplifier 312 receives the DC output voltage (Vout) and a reference voltage (Vref), and the error amplifier 312 may compare the DC output voltage (Vout) with the reference voltage (Vref) to generate a compensation signal (comp) to the PWM comparator 313.

Moreover, the current sensing amplifier 315 may detect the first current (I1) passing through the upper power transistor in the power stage circuit 330 or the second current (I2) passing through the lower power transistor. For example, the current sensing amplifier 315 may convert the first current (I1) passing through the upper power transistor to a sensing signal (Vsense).

In addition, the signal generator 314 may output a sawtooth waveform signal (ramp) and a clock signal (CLK) at the same time. The sawtooth waveform signal (ramp) and the clock signal (CLK) have the same first frequency. The sawtooth waveform signal (ramp) and the sensing signal (Vsense) are superposed by the adder 316 to be a sum signal (sum). The sum signal (sum) and the compensation signal (comp) are inputted to the PWM comparator 313. When the sum signal (sum) is stronger than the compensation signal (comp), the PWM comparator 313 may output a pulse wave to a reset terminal (R) of the SR latch 317. Furthermore, the clock signal (CLK) is inputted to a set terminal (S) of the SR latch 317. The PWM signal is generated according to the signal change of the reset terminal (R) and set terminal (S) of the SR latch. Besides the sawtooth waveform signal (ramp), the signal generator 314 also may output signals having other forms, such as the triangle waveform signal.

FIG. 3B is a schematic diagram showing the output current (Iout), the sensing signal (Vsense), the sawtooth waveform signal (ramp), the compensation signal (comp), the sum signal (sum), and the signals of the reset terminal (R) and the set terminal (S) of the SR latch, and the PWM signal of the DC to DC converter in the current mode.

The rising area of the output current (Iout) is the first current (I1) of the upper power transistor, and the falling area of the output current (Iout) is the second current (I2) of the lower power transistor. Therefore, the current sensing amplifier 315 may sense the first current (I1) to generate the sensing signal (Vsense). As shown in FIG. 3A and FIG. 3B, when the set terminal (S) of the SR latch receives the pulse wave, the PWM signal is in the high level, and when the reset terminal (R) of the SR latch receives a pulse wave, the PWM signal is in the low level. Therefore, the pulse width of the PWM signal changes with the value of the first current (I1).

FIG. 4A is a schematic diagram showing the conventional DC to DC converter in the constant on-time mode. The DC to DC converter in the constant on-time mode includes a control circuit 410, a gate driver circuit 420, and a power stage circuit 430. The control circuit 410 includes a loop comparator 412, a SR latch 414, and a timer 416. The timer 416 uses a constant current source (Ion) to charge a capacitor (Con), and the relationship between the charging voltage (Vcharge) and the constant current source (Ion) is $$V_{charge} = \frac{1}{C} \int I_{on} dt.$$

That is, as long as the timer 416 starts, the charging process is started. When the charging voltage reaches a predetermined voltage, the timer 416 may output the pulse wave to the reset terminal (R) of the SR latch. Since the value of the constant current source (Ion) and the capacitance of the capacitor (Con) are constant, the time for the charging voltage to reach the predetermined voltage is fixed, which is a constant on-time Ton.

In addition, the loop comparator 412 receives the DC output voltage (Vout) and a reference voltage (Vref). When the DC output voltage (Vout) is lower than the reference voltage (Vref), the loop comparator 412 outputs the pulse wave to the set terminal (S) of the SR latch 414. When the loop comparator 412 outputs the pulse wave to the set terminal (S) of the SR latch 414, it also controls the timer 416 to count time. After the time Ton, a pulse wave is outputted to the reset terminal (R) of the SR latch 414. The PWM signal is generated according to the signal changes of the reset terminal (R) and set terminal (S) of the SR latch 414.

FIG. 4B is a schematic diagram showing the output voltage (Vout), the signals of the reset terminal (R) and set terminal (S) of the SR latch, and the PWM signal in the DC to DC converter in the constant on-time mode.

When the outputted voltage (Vout) is lower than the reference voltage, the set terminal (S) of the SR latch receives the pulse wave. After the time Ton, the timer 416 generates the pulse wave to the reset terminal (R) of the SR latch. As shown in FIG. 4A and FIG. 4B, when the set terminal (S) of the SR latch receives a pulse wave, the PWM signal is in the high level. When the reset terminal (R) of the SR latch receives the pulse wave, the PWM signal is in the low level.

As everyone knows, the operating voltages of a CPU, a DRAM, a graphic chip, and a chip set in a computer system are different. As a result, the computer system needs many DC to DC converters to convert the DC input voltage (such as 19V) provided by a power supply to the operating voltages for the components. However, the transient of the DC to DC converter may greatly influence the performance of the components.

When the load of the DC to DC converter changes greatly, the output current (Iout) changes rapidly. For example, when the output current (Iout) of the DC to DC converter decreases suddenly, the DC output voltage (Vout) increases quickly, which is called an overshoot. On the contrary, when the output current (Iout) of the DC to DC converter increases suddenly, the DC output voltage decreases quickly, which is called an undershoot.

When the overshoot or the undershoot is generated, the control circuit in the DC to DC converter should bring the over high or over low DC output voltage back to a voltage in a steady state. For example, when the overshoot happens, the transient DC output voltage is higher than the DC output voltage in the steady state. When the difference value between the transient DC output voltage and the DC output voltage is larger than a maximum value, the difference voltage between the transient DC output voltage and the DC output voltage is the overshoot voltage.

As shown in FIG. 5, if an operating frequency of the PWM signal of the DC to DC converter in the voltage mode is 200 KHz, and the DC output voltage in the steady state is 1.26V, when the output current decreases from 90 A to 5 A rapidly, the transient DC output voltage may increase to 1.36V. That is, the overshoot voltage is 100 mV. As shown in FIG. 6, if the operating frequency of the PWM signal of the DC to DC converter in the constant on-time mode is 276 KHz, and the DC output voltage in the steady state is 1.96V, when the output current decreases from 25 A to 1.5 A, the transient DC output voltage increases to 2.04V, and the overshoot voltage is 80 mV.

The designers of the DC to DC converter provide methods for improving the overshoot and undershoot. However, most designers designing the DC to DC converter improve the undershoot, and few people engages in the overshoot.

The U.S. Pat. No. 7,157,943 discloses a frequency selection of switch mode power converters via soft start voltage level. The switch mode power converter disclosed in the patent is described to be able to reduce the overshoot. However, the patent does not give out ideas about how to reduce the overshoot in application.

In addition, the Taiwan patent 1251395 discloses a PWM device for changing the output frequency automatically using an output voltage feedback hysteresis circuit. Obviously, the patent is disclosed to reduce the affection due to the loss of the upper power transistor or the lower power transistor. In addition, the PWM signal in the patent changes continuously. Therefore, the stableness of the DC to DC converter is worse.

SUMMARY OF THE INVENTION

The invention discloses a DC to DC converter including a control circuit, a gate driver circuit, and a power stage circuit. The control circuit receives a DC output voltage and compares the DC output voltage. When the DC output voltage lower than a first threshold voltage, the control circuit outputs a PWM signal with a first frequency. When the DC output voltage higher than the first threshold voltage, the control circuit outputs the PWM signal with a second frequency and the second frequency is higher than the first frequency. The gate driver circuit receives the PWM signal to convert the PWM signal to a first driving signal and a second driving signal. The power stage circuit converts a DC input voltage to the DC output voltage according to the first driving signal and the second driving signal.

The invention further discloses a method for controlling a DC to DC converter. The DC to DC converter includes a control circuit, a gate driver circuit, and a power stage circuit. The control circuit may receive a DC output voltage generated by the power stage circuit and generate a corresponding PWM signal according to the change of the DC output voltage. The gate driver circuit receives the PWM signal to convert the PWM signal to a first driving signal and a second driving signal to the power stage circuit to make the power stage circuit convert a DC input voltage to the DC output voltage according to the change of the first driving signal and the second driving signal. The method for controlling the DC to DC converter includes steps as follows. The DC output voltage is monitored continuously. When the DC output voltage lower than a first threshold voltage, the operating frequency of the PWM signal is switched to a first frequency. When the DC output voltage higher than the first threshold voltage, the operating frequency of the PWM signal is switched to a second frequency and the second frequency is higher than the first frequency.

The invention further discloses a method for controlling a DC to DC converter. The DC to DC converter includes a control circuit, a gate driver circuit, and a power stage circuit. The control circuit receives a DC output voltage generated by the power stage circuit and generates a corresponding PWM signal according to the change of the DC output voltage. The gate driver circuit receives the PWM signal and converts the PWM signal to a first driving signal and a second driving signal to the power stage circuit to make the power stage circuit convert a DC input voltage to the DC output voltage and a output current passing through a sensing impedor and a load according to the change of the first driving signal and the second driving signal. The method for controlling the DC to DC converter includes steps as follows. A sensing voltage generated by the output current passing through the sensing impedor is monitored continuously. When the sensing voltage is lower than an offset voltage, the operating frequency of the PWM signal is switched to a first frequency. When the output current decreases rapidly to make the sensing voltage increase, the operating frequency of the PWM signal is switched to a second frequency, and the second frequency is higher than a first frequency.

These and other features, aspects and advantages of the present invention will become better understood with regard to the following description, appended claims, and accompanying drawings.

BRIEF DESCRIPTION OF THE DRAWINGS

FIG. 5 is a schematic diagram showing the overshoot voltage in the conventional DC to DC converter in the voltage mode;

FIG. 6 is a schematic diagram showing the overshoot voltage in the conventional DC to DC converter in the constant on-time mode;

DETAILED DESCRIPTION OF THE PREFERRED EMBODIMENT

Figure 1:
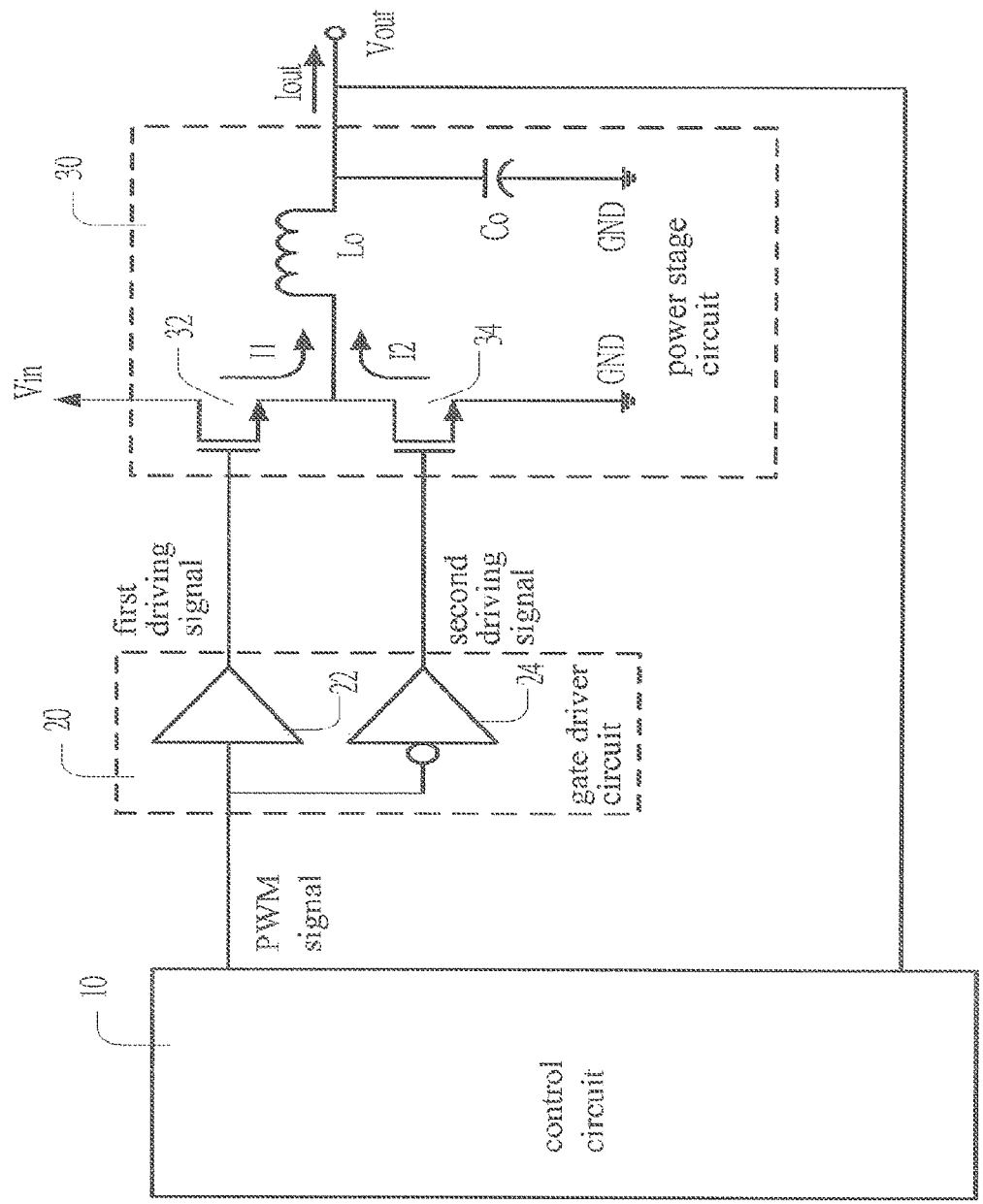
FIG. 1 is a schematic diagram showing a conventional DC to DC converter.
Figure 2A:
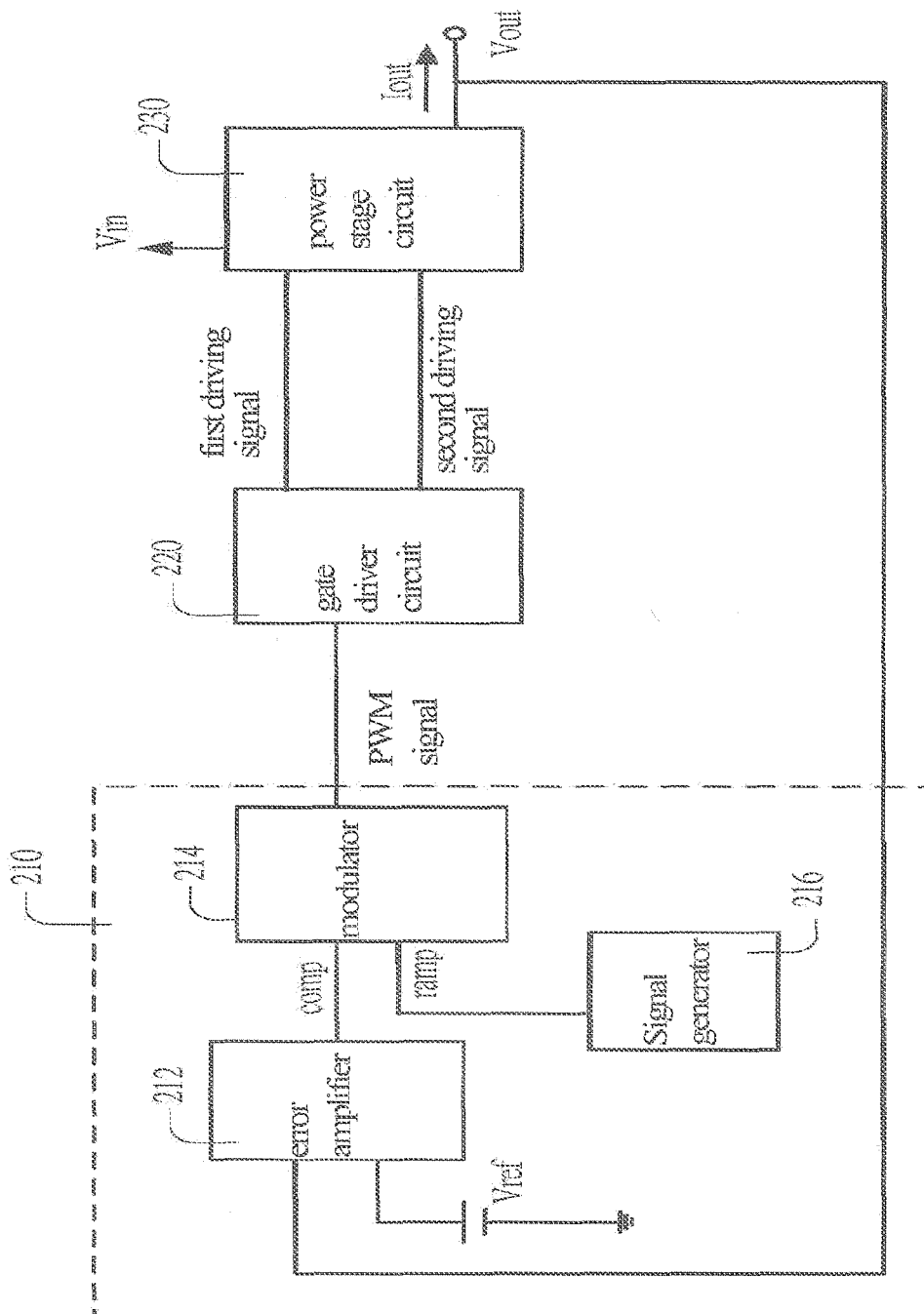
FIG. 2A is a schematic diagram showing the conventional DC to DC converter in the voltage mode.
Figure 2B:
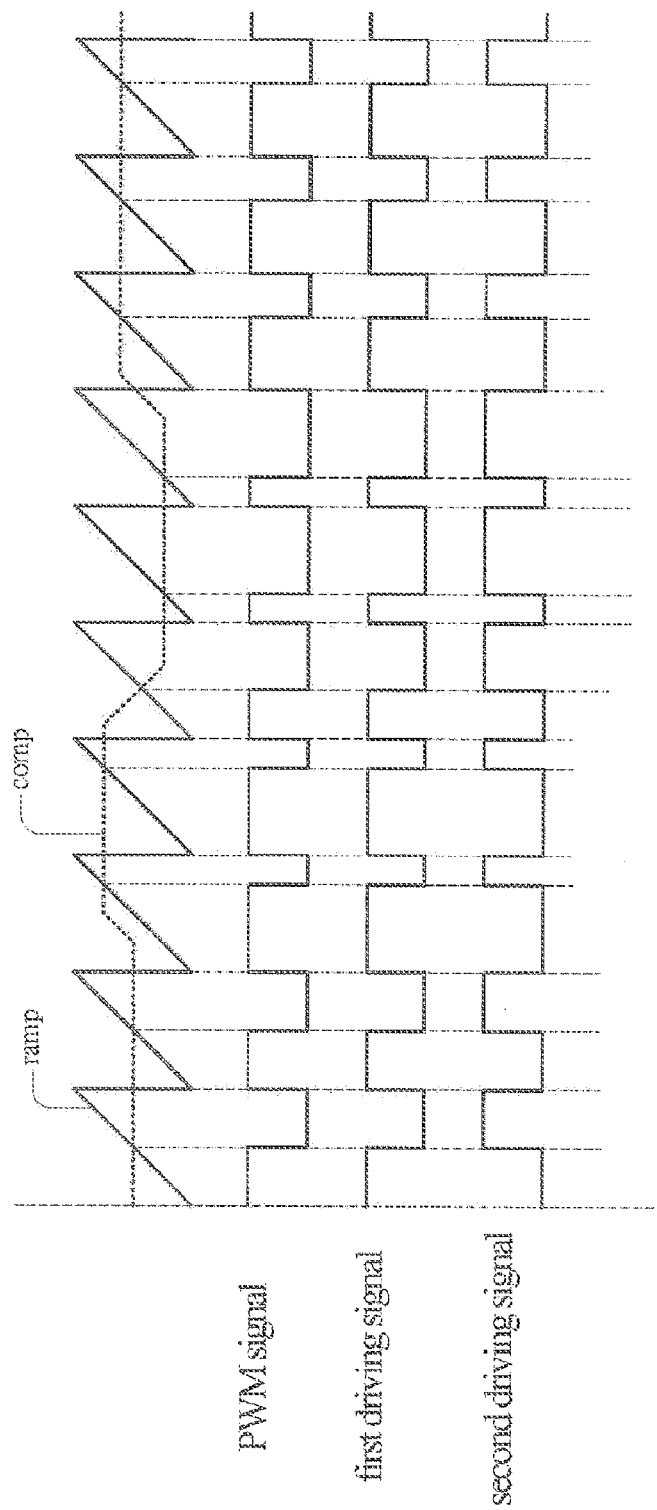
FIG. 2B is a schematic diagram showing the compensation signal (comp), the sawtooth waveform signal (ramp), the PWM signal, the first driving signal, and the second driving signal in the voltage mode.
Figure 3A:
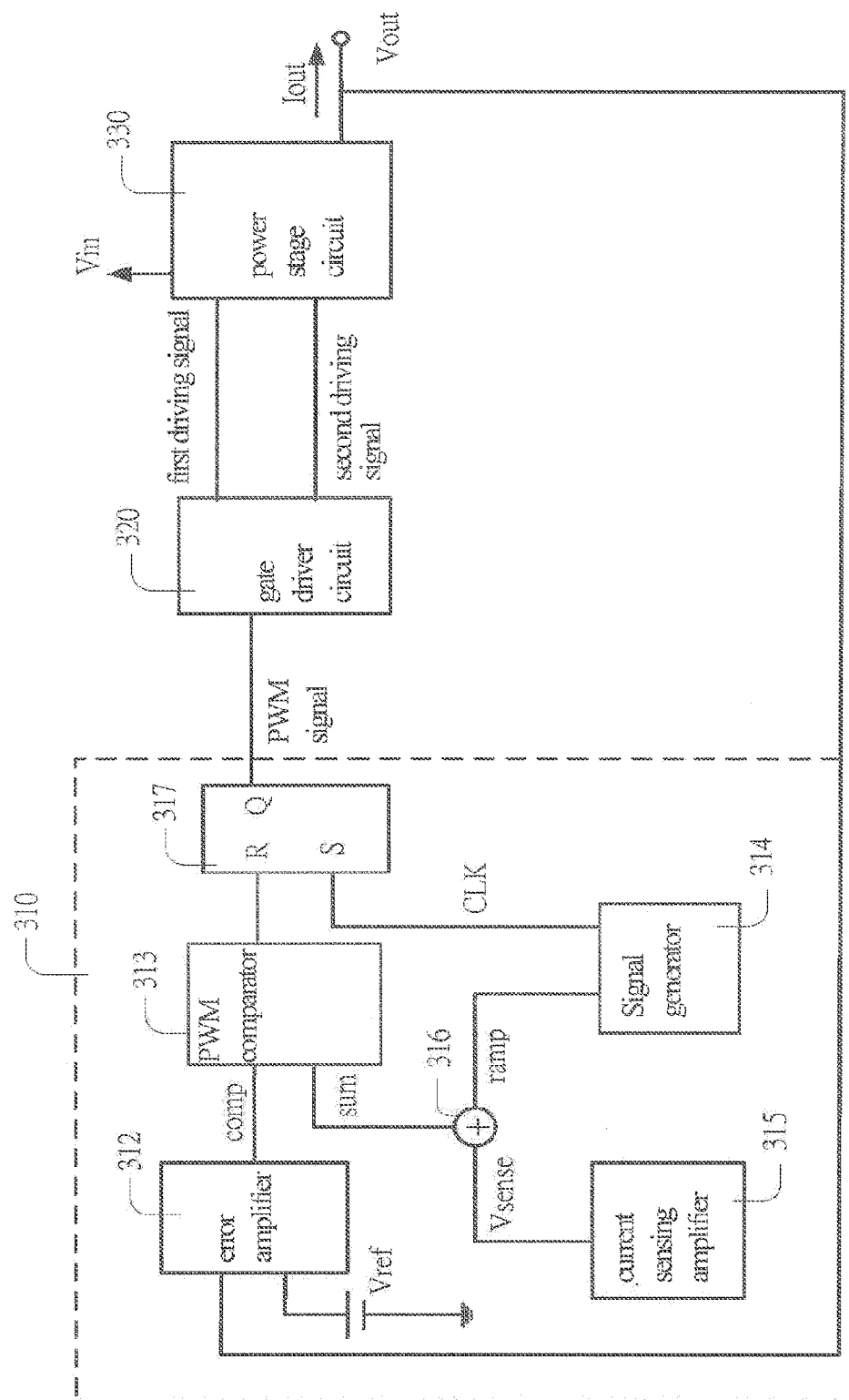
FIG. 3A is a schematic diagram showing the conventional DC to DC converter in the current mode.
Figure 3B:
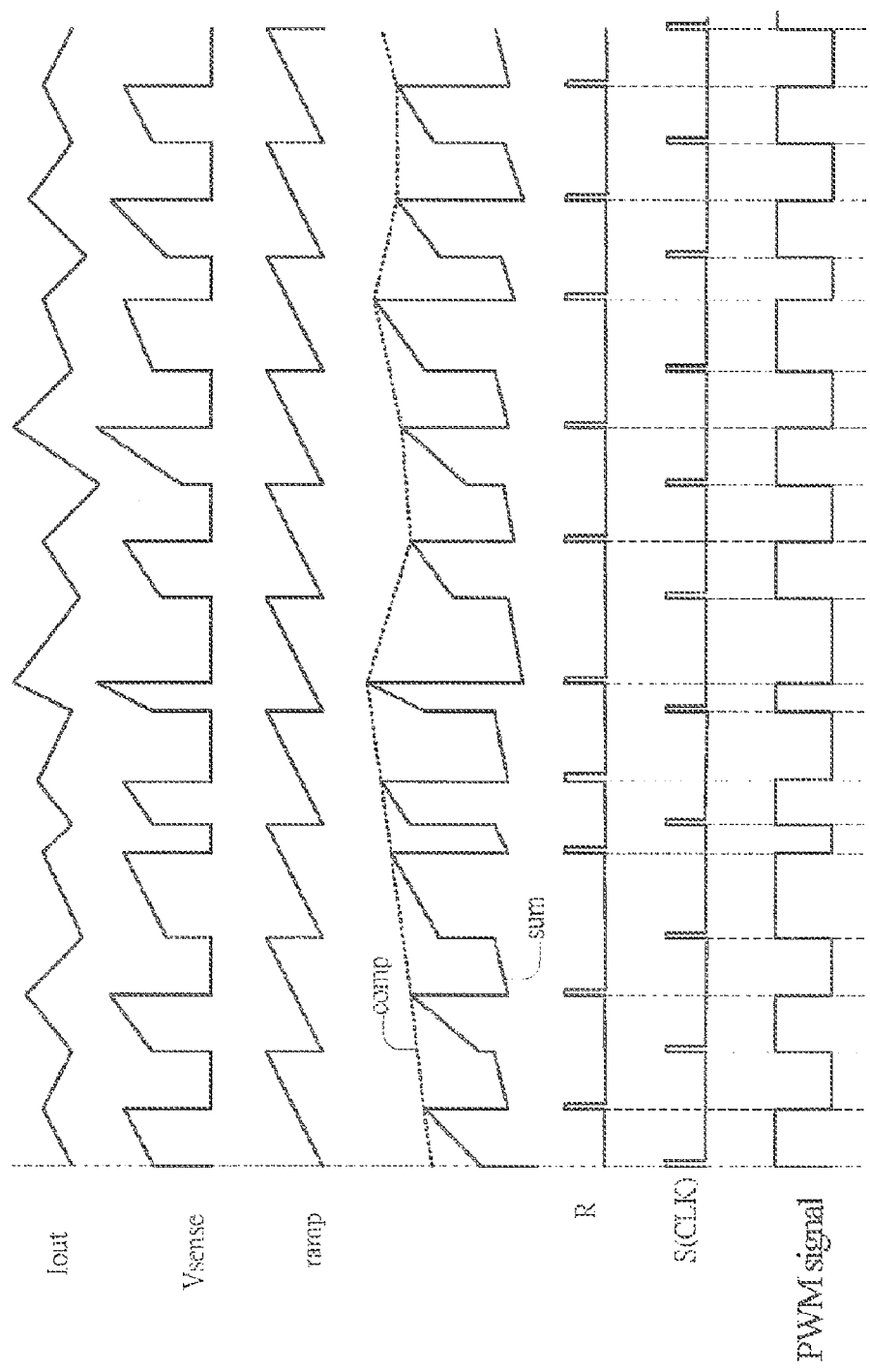
FIG. 3B is a schematic diagram showing the output current (Iout), the sensing signal (Vsense), the sawtooth waveform signal (ramp), the compensation signal (comp), the sum signal (sum), and the signals of the reset terminal and the set terminal of the SR latch and the PWM signal of the DC to DC converter in the current mode.
Figure 4A:
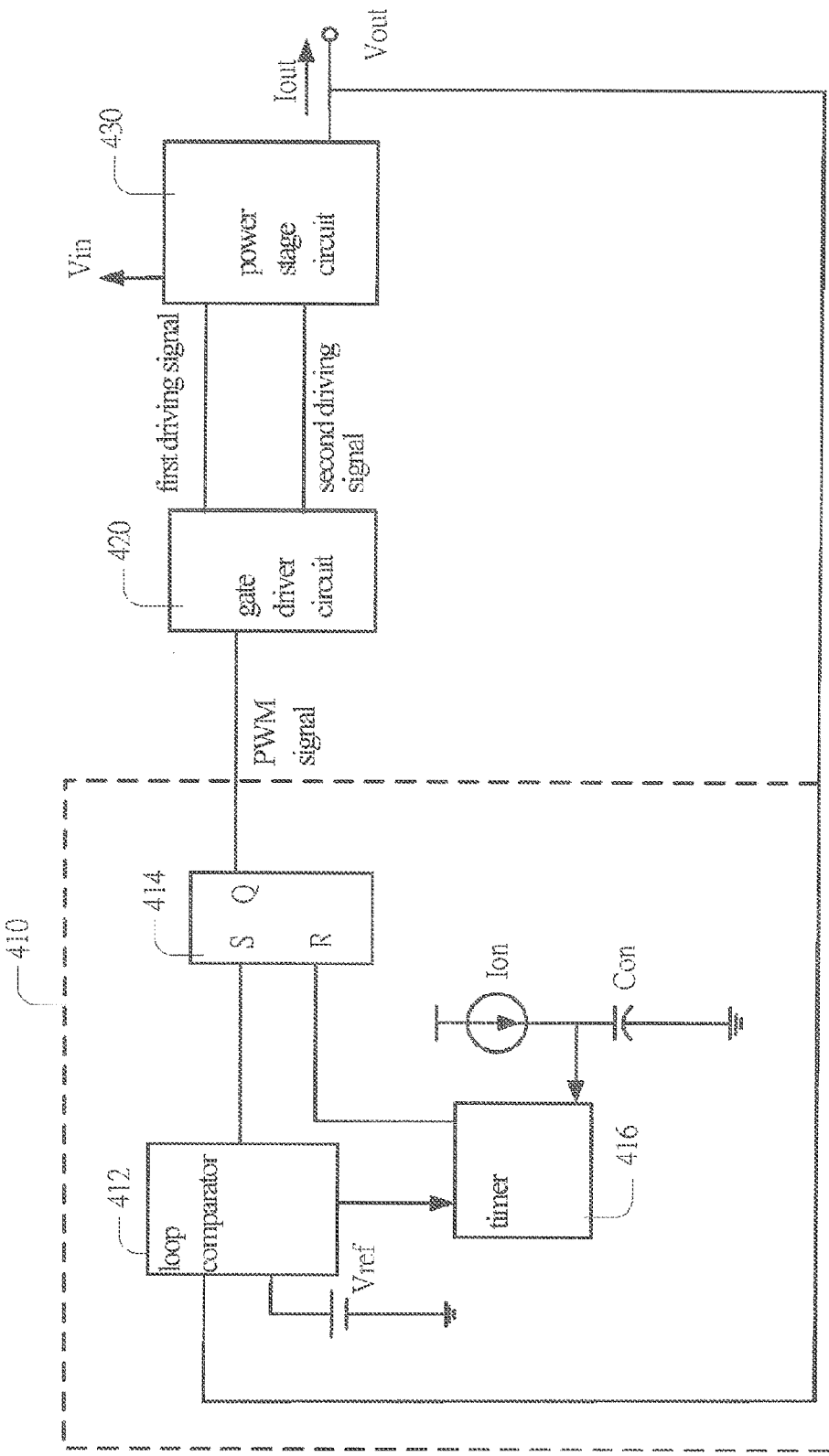
FIG. 4A is a schematic diagram showing the conventional DC to DC converter in the constant on-time mode.
Figure 4B:
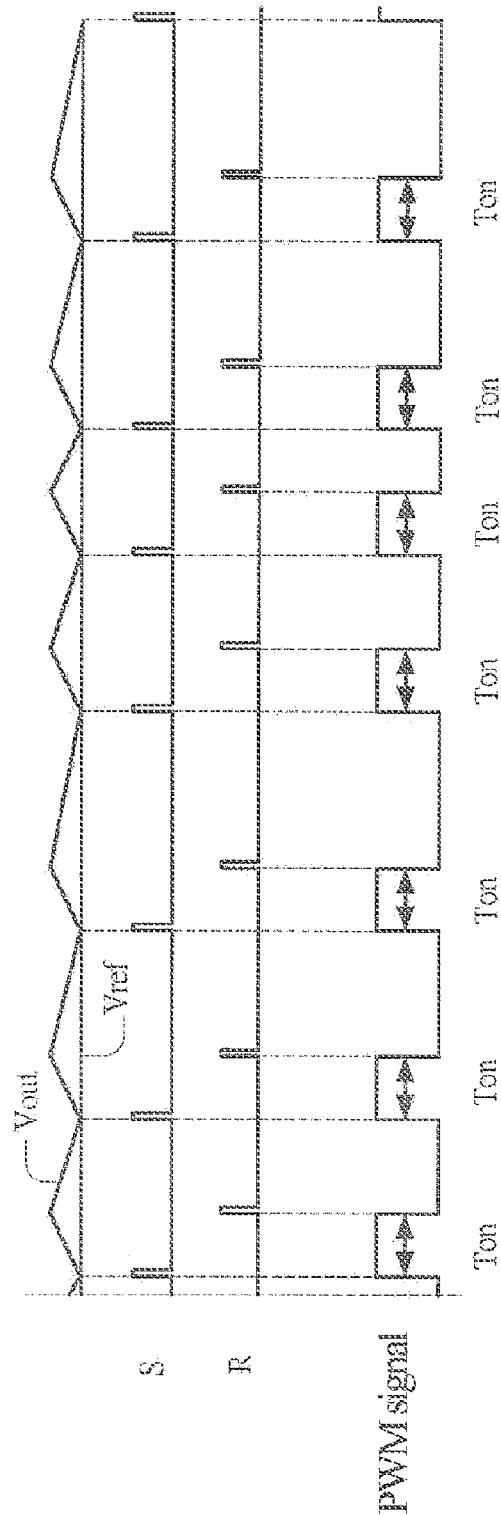
FIG. 4B is a schematic diagram showing the output voltage (Vout), the signals of the reset terminal (R), and set terminal (S) of the SR latch and the PWM signal in the DC to DC converter in the constant on-time mode.
Figure 7:
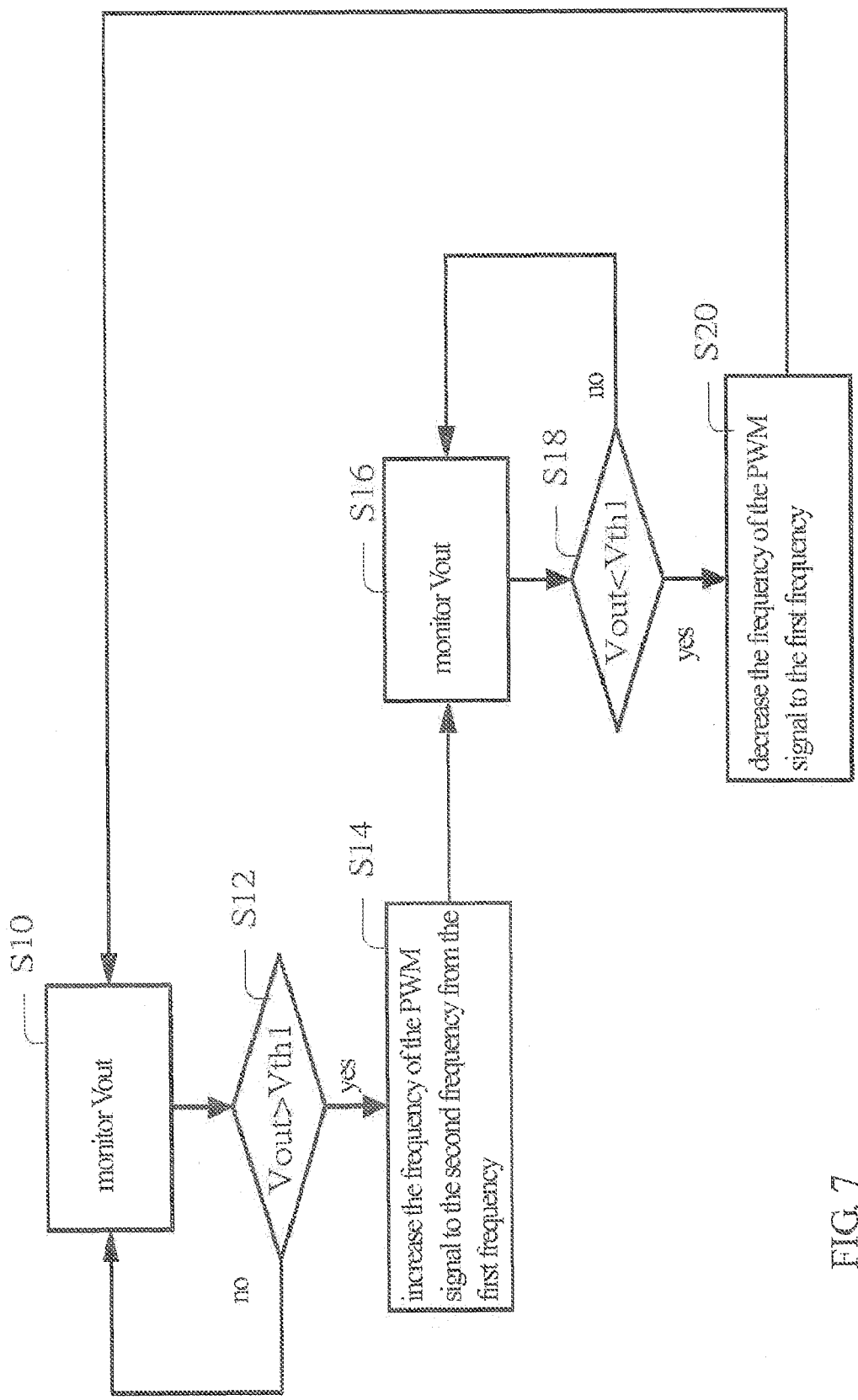
FIG. 7 is a flow chart showing a method for controlling a DC to DC converter in an embodiment of the invention.

FIG. 7 is a flow chart showing a method for controlling a DC to DC converter in an embodiment of the invention. First, a DC output voltage is monitored continuously (step S10). When the DC output voltage is lower than the first threshold voltage (step S12), step S10 is performed. On the contrary, when the DC output voltage is higher than the first threshold voltage (step S12), the frequency of the PWM signal is increased. That is, the frequency of the PWM signal increases from a first frequency to a second frequency (step S14). Then, the DC output voltage is monitored continuously (step S16). When the DC output voltage is higher than the first threshold voltage (step S18), step S16 is performed. On the contrary, when the DC output voltage is lower than the first threshold voltage (step S18), the PWM signal is restored to the original frequency. That is, the frequency decreases from the second frequency to the first frequency (step S20), and the step S10 is performed.

According to the embodiments of the invention, the DC output voltage is monitored continuously. When the DC output voltage higher than the first threshold voltage (Vth1) (for example, Vth1=Vout+Delta, Vout is the DC output voltage in the steady state, and Delta may be 0.03 Vout), it means that the DC to DC converter has the overshoot. At that moment, the control circuit increases the operating frequency of the PWM signal to the second frequency to increase the switching speeds of the upper power transistor and the lower power transistor. Thus, the overshoot voltage may be restrained effectively.

In addition, when the DC output voltage is lower than the first threshold voltage (such as 1.03 times of the DC output voltage in the steady state), it means that the DC to DC converter goes back to the steady state soon. At that moment, the control circuit brings the operating frequency of the PWM signal back to the first frequency.

The DC to DC converter in the voltage mode, the DC to DC converter in the current mode, and the DC to DC converter in the constant on-time mode are illustrated hereinbelow.

Figure 8A:
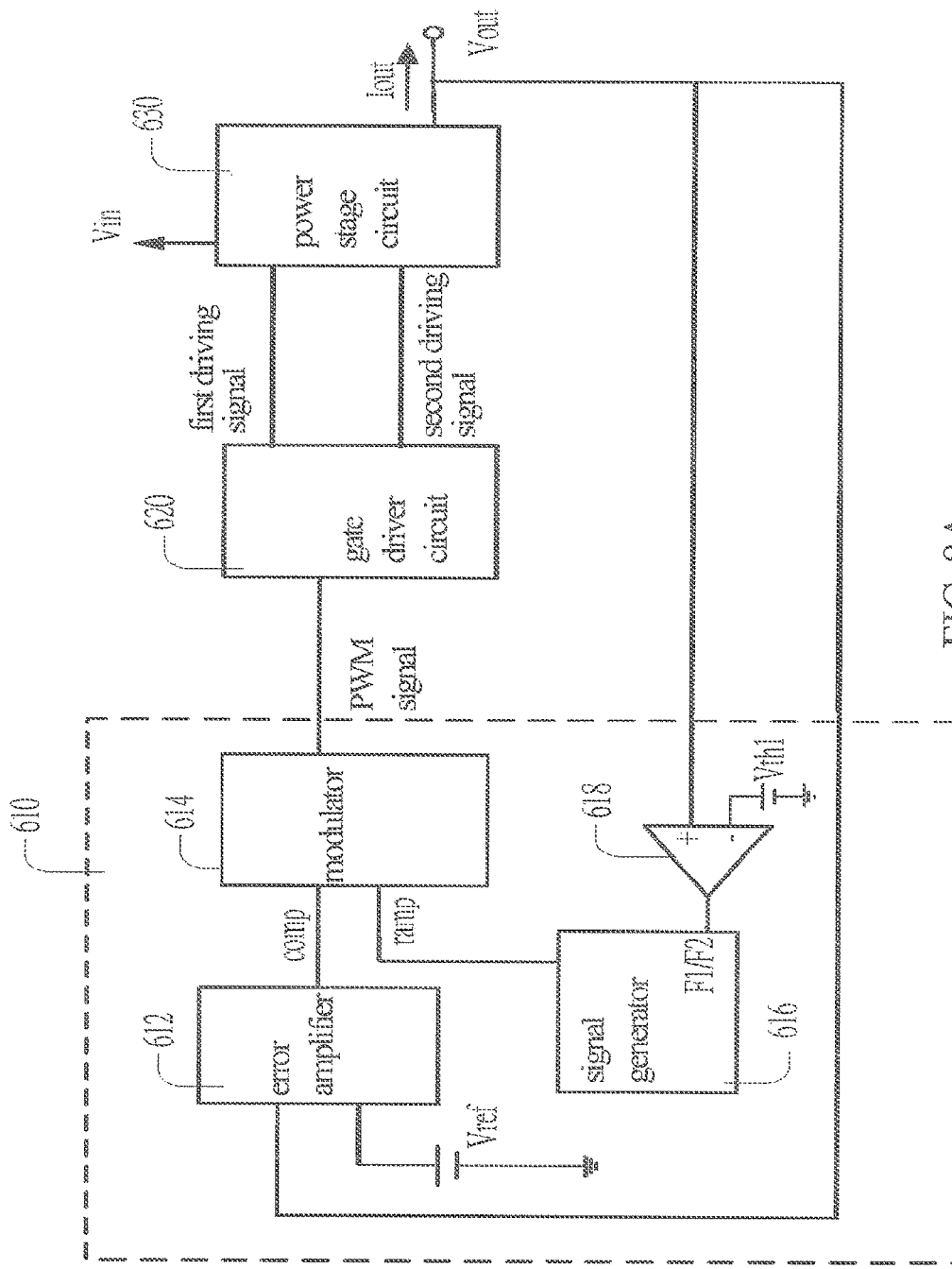
FIG. 8A is a schematic diagram showing the DC to DC converter in the voltage mode in the first embodiment of the invention.

FIG. 8A is a schematic diagram showing the DC to DC converter in the voltage mode in the first embodiment of the invention. The DC to DC converter in the voltage mode includes a control circuit 610, a gate driver circuit 620, and a power stage circuit 630. The control circuit 610 includes an error amplifier 612, a modulator 614, a signal generator 616, and a comparator 618.

The error amplifier 612 receives the DC output voltage (Vout) and a reference voltage (Vref), and it may compare the DC output voltage (Vout) with the reference voltage (Vref) to generate a compensation signal (comp) to the modulator 614.

In addition, the signal generator 616 may output a sawtooth waveform signal (ramp) with the first frequency (F1) or the second frequency (F2) selectively to the modulator 614 to make the modulator 614 generate a PWM signal according to the compensation signal (comp) and the sawtooth waveform signal (ramp). The signal generator 616 not only can output the sawtooth waveform signal (ramp) with the first frequency (F1) and the second frequency (F2), but also can output waves such as a triangle waveform signal having other forms with the first frequency (F1) and the second frequency (F2). The first frequency (F1) is lower than the second frequency (F2).

In addition, the comparator 618 may receive the first threshold voltage (Vth1) and the DC output voltage (Vout). When the DC output voltage (Vout) is lower than the first threshold voltage (Vth1), the comparator 618 may output the first level signal to the signal generator 616 to make the signal generator 616 output the sawtooth waveform signal (ramp) with the first frequency (F1) to the modulator 614. On the contrary, when the DC output voltage (Vout) is higher than the first threshold voltage (Vth1), the comparator 618 may output the second level signal to the signal generator 616 to make the signal generator 616 output the sawtooth waveform signal (ramp) with the second frequency (F2) to the modulator 614.

Figure 8B:
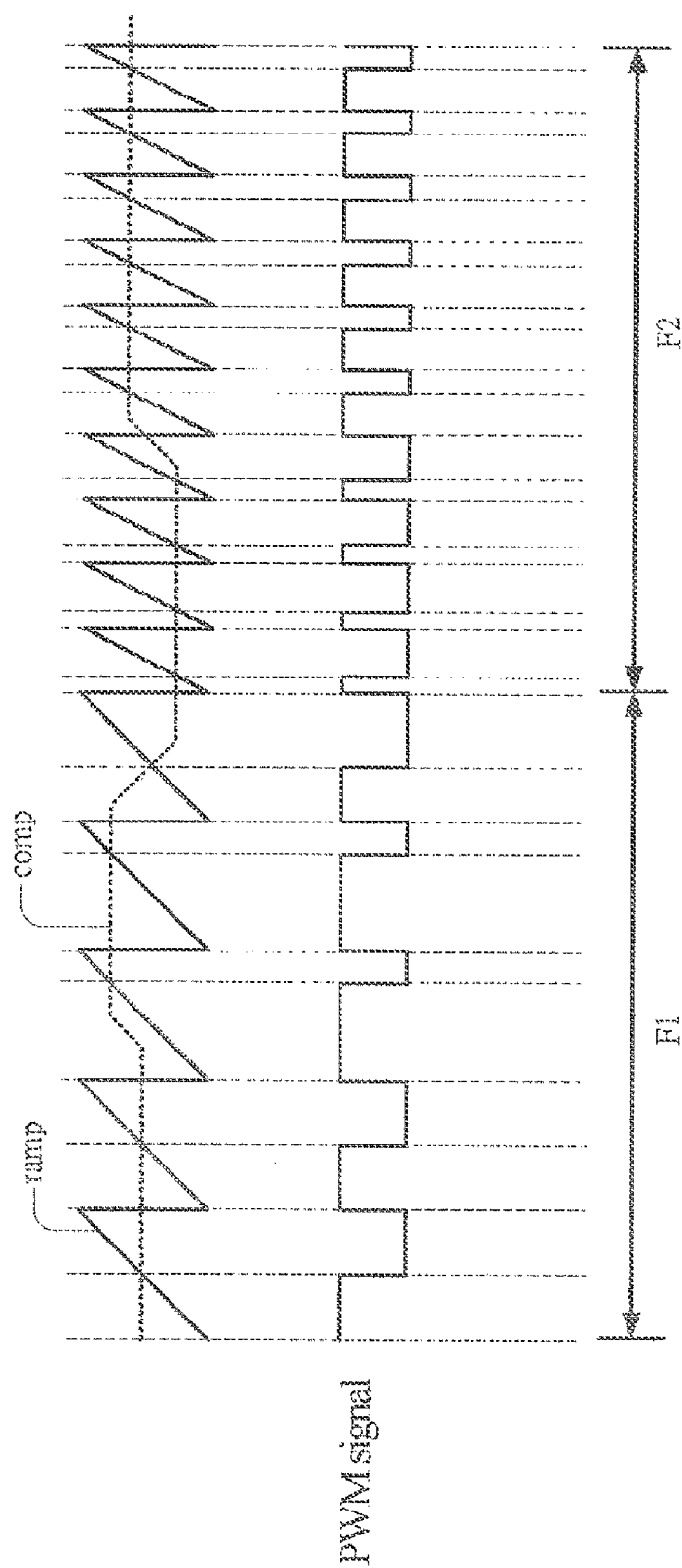
FIG. 8B is a schematic diagram showing the compensation signal (comp), the sawtooth waveform signal (ramp), and the PWM signal in the DC to DC converter in the voltage mode.

FIG. 8B is a schematic diagram showing the compensation signal (comp), the sawtooth waveform signal (ramp) and the PWM signal in the DC to DC converter in the voltage mode. When the compensation signal (comp) is higher than the sawtooth waveform signal (ramp), the PWM signal is in the high level. On the contrary, when the compensation signal (comp) is lower than the sawtooth waveform signal (ramp), the PWM signal is in the lower level. Obviously, when the sawtooth waveform signal (ramp) changes, the pulse width of the PWM signal changes therewith. In addition, when the sawtooth waveform signal (ramp) is in the first frequency (F1), the PWM signal operates at the first frequency (F1), and when the sawtooth waveform signal (ramp) is in the second frequency (F2), the PWM signal operates at the second frequency (F2). Therefore, the DC to DC converter in the voltage mode in the embodiments of the invention may control the operating frequency of the PWM signal according to the DC output voltage (Vout).

Figure 9:
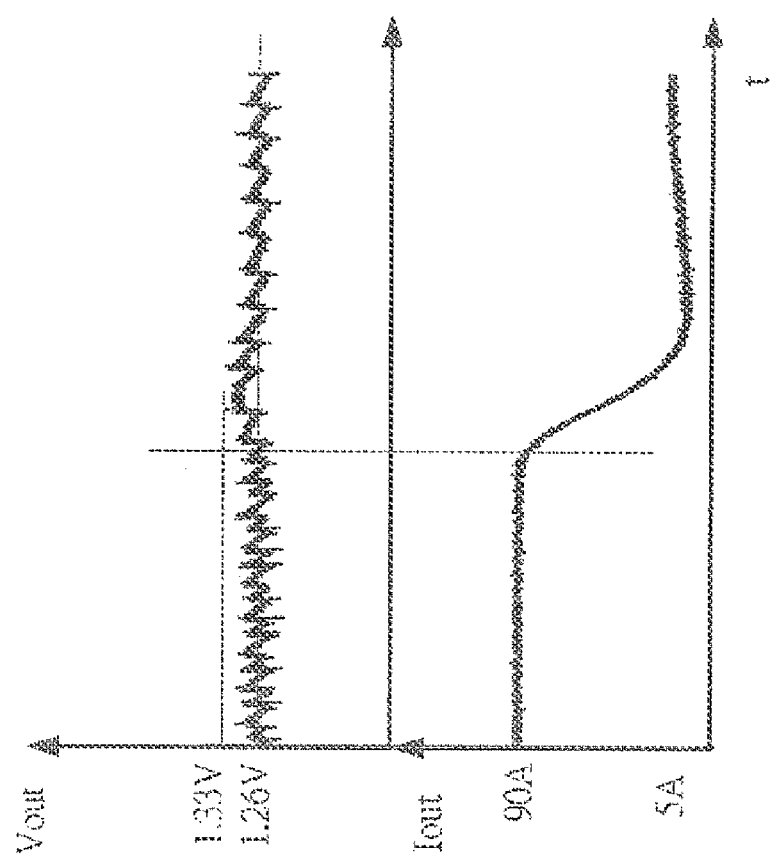
FIG. 9 is a schematic diagram showing the overshoot voltage in the DC to DC converter in the voltage mode in the second embodiment of the invention.

As shown in FIG. 9, according to the first embodiment of the invention, if the first frequency (F1) of the PWM signal of the DC to DC converter in the voltage mode is 200 KHz, and the DC output voltage (Vout) in the steady state is 1.26V, when the output current decreases to 5 A from 90 A rapidly, the PWM signal is adjusted to the second frequency (342 KHz) to increase the transient DC output voltage (Vout) to 1.33V. That is, the overshoot voltage is 70 mA. Consequently, and the overshoot voltage may be restrained effectively.

Figure 10A:
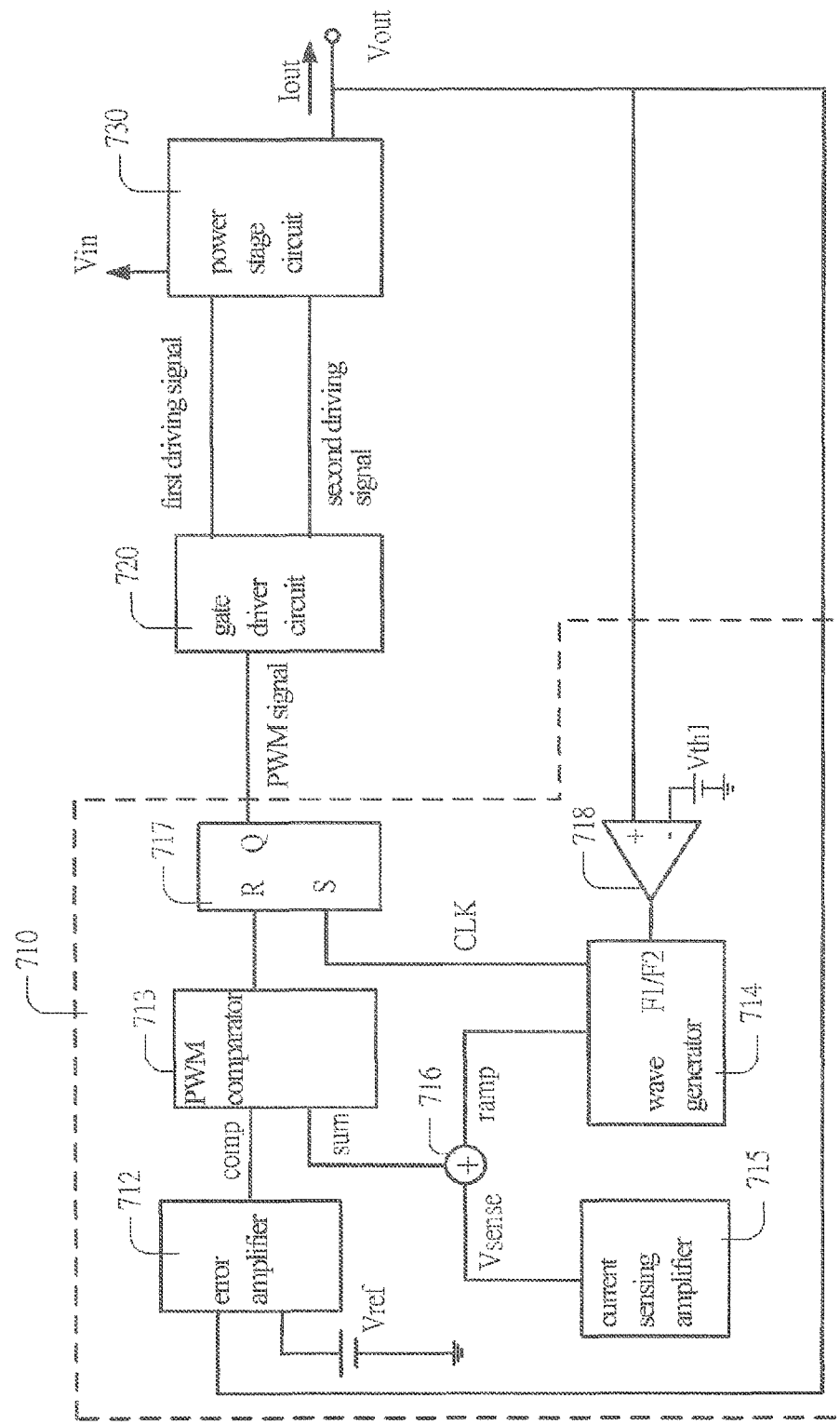
FIG. 10A is a schematic diagram showing the DC to DC converter in the current mode in the second embodiment of the invention.

FIG. 10A is a schematic diagram showing the DC to DC converter in the current mode in the second embodiment of the invention. The DC to DC convert ring the current mode includes a control circuit 710, a gate driver circuit 720, and a power stage circuit 730. The control circuit 710 includes an error amplifier 712, a PWM comparator 713, a signal generator 714, a current sensing amplifier 715, an adder 716, a SR latch 717, and a comparator 718. The error amplifier 712 receives the DC output voltage (Vout) and a reference voltage (Vref), and the error amplifier 712 may compare the DC output voltage (Vout) with the reference voltage (Vref) to generate a compensation signal (comp) to the PWM comparator 713.

In addition, the current sensing amplifier 715 may detect the first current (I1) passing through the upper power transistor of the power stage circuit 730 or the second current (I2) passing through the lower power transistor. For example, the current sensing amplifier 715 may convert the current (I1) passing through the upper power transistor to the sensing signal (Vsense).

In addition, the signal generator 714 may output the sawtooth waveform signal (ramp) and a clock signal (CLK) at the same time. The sawtooth waveform signal (ramp) and the clock signal (CLK) may have the same first frequency (F1) or the second frequency (F2) selectively. The sawtooth waveform signal (ramp) and the sensing signal (Vsense) are superposed by the adder 716 to be the sum signal (sum). The first frequency (F1) is lower than the second frequency (F2).

The sum signal (sum) and the compensation signal (comp) are inputted to the PWM comparator 713. When the sum signal (sum) is higher than the compensation signal (comp), the PWM comparator 713 outputs a pulse wave to the reset terminal (R) of the SR latch 717. In addition, the clock signal (CLK) is inputted to the set terminal (S) of the SR latch 717. The PWM signal is generated according to the signal change of the reset terminal (R) and the set terminal (S) of the SR latch 717. The signal generator 714 not only can output the sawtooth waveform signal (ramp), but also can output the triangle waveform signal.

In addition, the comparator 718 may receive the first threshold voltage (Vth1) and the DC output voltage (Vout). When the DC output voltage (Vout) is lower than the first threshold voltage (Vth1), the comparator 718 may output the first level signal to the signal generator 714 to make the signal generator 714 output the sawtooth waveform signal (ramp) and the clock signal (CLK) with the first frequency (F1). On the contrary, when the DC output voltage (Vout) is higher than the first threshold voltage (Vth1), the comparator 718 may output the second level signal to the signal generator 714 to make the signal generator 714 output the sawtooth waveform signal (ramp) and the clock signal (CLK) with the second frequency (F2).

Figure 10B:
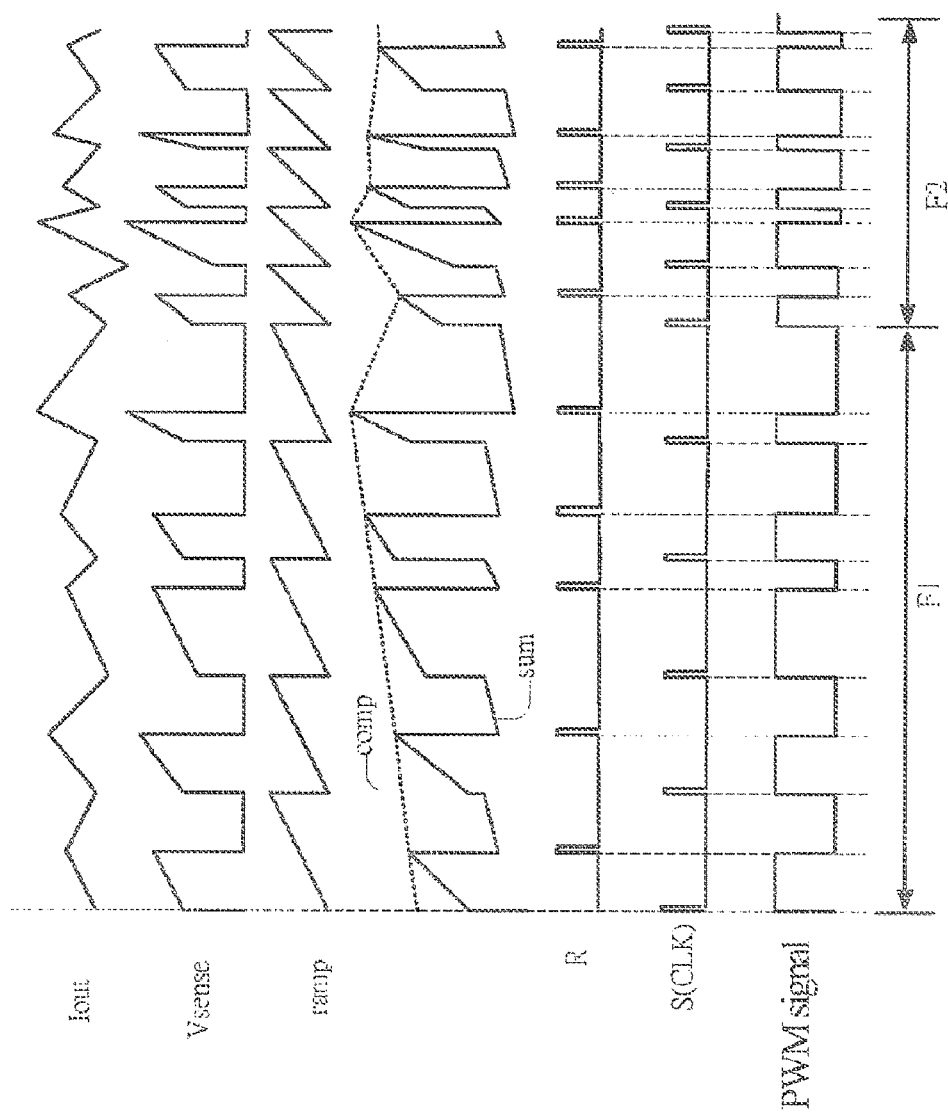
FIG. 10B is a schematic diagram showing the output current (Iout), the sensing signal (Vsense), the sawtooth waveform signal (ramp), the compensation signal (comp), the sum signal (sum), the signals of the reset terminal (R) and the set terminal (S) of the SR latch, and the PWM signal of the DC to DC converter in the current mode.

FIG. 10B is a schematic diagram showing the output current (Iout), the sensing signal (Vsense), the sawtooth waveform signal (ramp), the compensation signal (comp), the sum signal (sum), the signals of the reset terminal (R) and the set terminal (S) of the SR latch and the PWM signal of the DC to DC converter in the current mode.

The rising area of the output current (Iout) is the first current (I1) of the upper power transistor, and the falling area of the output current (Iout) is the second current (I2) of the lower power transistor. Therefore, the current sensing amplifier 715 may detect the first current (I1) to generate the sensing signal (Vsense). As shown in FIG. 10A and FIG. 10B, when the set terminal (S) of the SR latch receives the pulse wave, the PWM signal is in the high level. When the reset terminal (R) of the SR latch receives the pulse wave, the PWM signal is in the low level. Therefore, the pulse width of the PWM signal may change along with the first current (I1). In addition, when the sawtooth waveform signal (ramp) and the clock signal (CLK) are in the first frequency (F1), the PWM signal operates in the first frequency (F1). When the sawtooth waveform signal (ramp) and the clock signal (CLK) are in the second frequency (F2), the PWM signal operates in the second frequency (F2). Therefore, the DC to DC converter in the current mode may control the operating frequency of the PWM signal according to the DC output voltage (Vout).

Figure 11A:
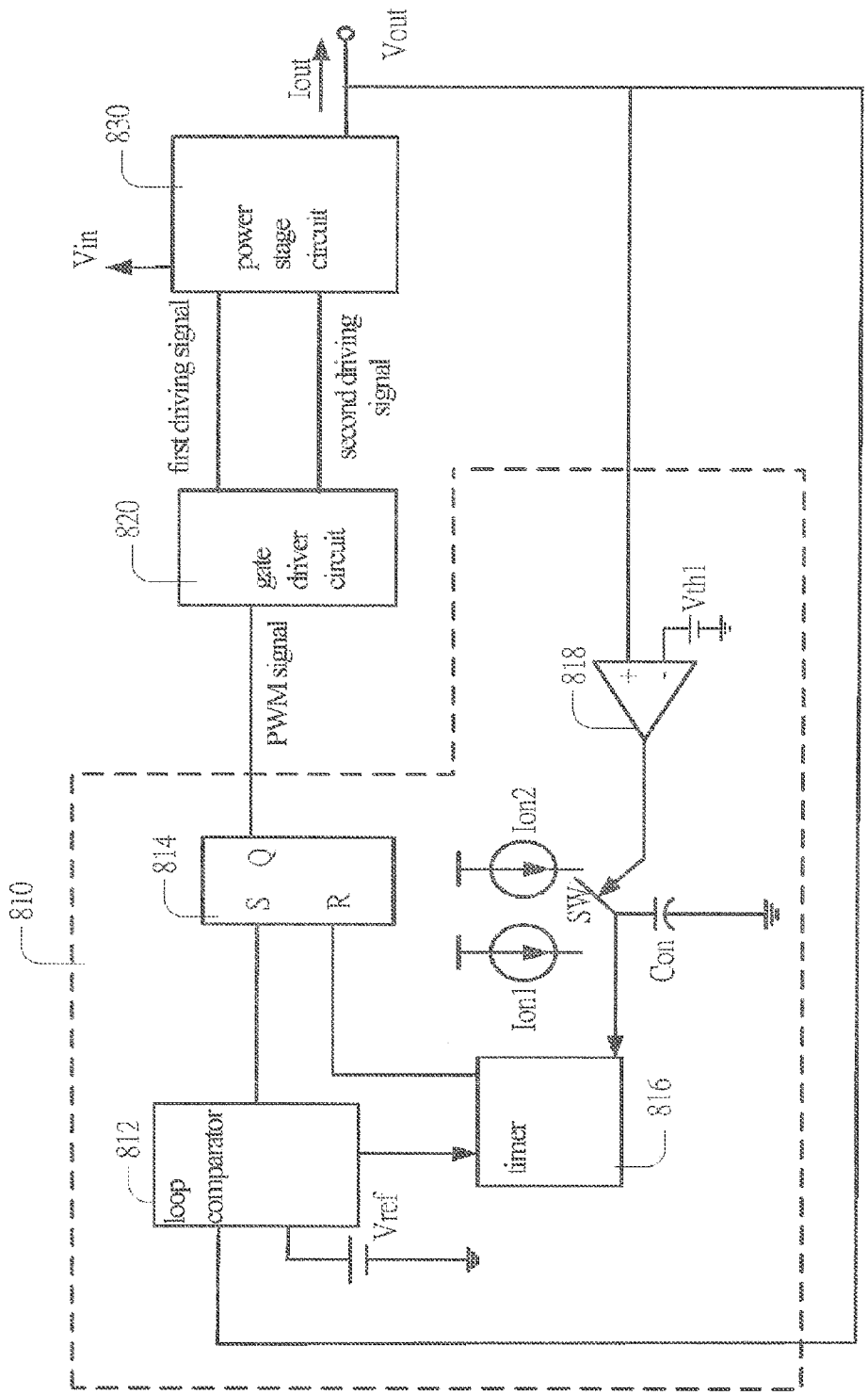
FIG. 11A is a schematic diagram showing DC to DC converter in the constant on-time mode in the third embodiment of the invention.

FIG. 11A is a schematic diagram showing DC to DC converter in the constant on-time mode in the third embodiment of the invention. The DC to DC converter in the constant on-time mode includes a control circuit 810, a gate driver circuit 820, and a power stage circuit 830. The control circuit 810 includes a loop comparator 812, a SR latch 814, a timer 816 and a comparator 818. The timer 816 may use a first constant current source (Ion1) or a second constant current source (Ion2) to charge a capacitor (Con). The value of the first constant current source (Ion1) is lower than the value of second constant current source (Ion2), and the relationship between the charging voltage (Vcharge) and the first constant current source (Ion2) is $$V_{charge} = \frac{1}{C}\int I_{on1} dt.$$

The relationship between the charging voltage (Vcharge) and the second constant current source (Ion2) is $$V_{charge} = \frac{1}{C}\int I_{on2} dt.$$

That is, as long as the start time timer 816 is started, a first constant current source (Ion1) or a second constant current source (Ion2) may be used to charge a capacitor (Con). When the charging voltage reaches a predetermined voltage, the timer 816 may output the pulse wave to the reset terminal (R) of the SR latch 814. Obviously, when the first constant current source (Ion1) charges the capacitor, the time in which the charging voltage (Vcharge) reaches the predetermined voltage is a constant on-time Ton1. Similarly, when the second constant current source charges the capacitor, the time in which the charging voltage (Vcharge) reaches the predetermined voltage is a constant on-time Ton2.

In addition, the loop comparator 812 receives the DC output voltage (Vout) and a reference voltage (Vref). When the DC output voltage (Vout) is lower than the reference voltage (Vref), the loop comparator 812 outputs the pulse wave to the set terminal (S) of the SR latch 814. When the loop comparator 812 outputs the pulse wave to the set terminal (S) of the SR latch 814, it also controls the timer 816 to start to count time, and the pulse wave is outputted to the reset terminal (R) of the SR latch 814 after the time Ton1 or Ton2. The PWM signal may be generated according to the signal change of the reset terminal and set terminal (S) of the SR latch 814.

In addition, the comparator 818 may receive the first threshold voltage (Vth1) and the DC output voltage (Vout). When the DC output voltage (Vout) is lower than the first threshold voltage (Vth1), the comparator 818 may output the first level signal to control the switch (SW) to make the first constant current source charge the capacitor (Con). On the contrary, when the DC output voltage (Vout) is higher than the first threshold voltage (Vth1), the comparator 818 outputs a second level signal to control the switch (SW) to make the second constant current source (Ion2) charge the capacitor (Con).

Figure 11B:
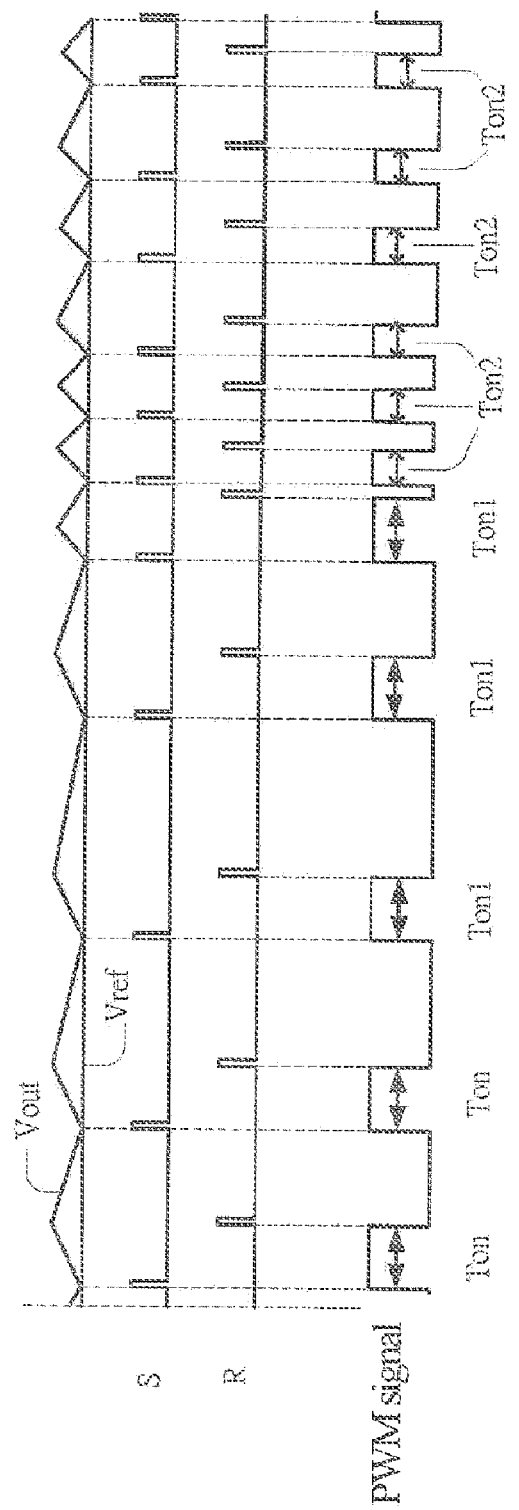
FIG. 11B is a schematic diagram showing the output voltage (Vout), the signals of the reset terminal (R) and the set terminal (S), and the PWM signal of the DC to DC converter in the constant on-time mode.

FIG. 11B is a schematic diagram showing the output voltage (Vout), the signals of the reset terminal (R) and the set terminal (S), and the PWM signal of the DC to DC converter in the constant on-time mode.

When the output voltage is lower than the reference voltage (Vref), the set terminal (S) of the SR latch receives the pulse wave. When the switch (SW) switches to the first constant current source (Ton1), after Ton1 time, the timer 816 is turned on to generate the pulse wave to the reset terminal (R) of the SR latch. On the contrary, when the switch (SW) switches to the second constant current source (Ion2), after Ton2 time, the timer 816 generates the pulse wave to the reset terminal (R) of the SR latch. As shown in FIG. 11A and FIG. 11B, when the set terminal (S) of the SR latch receives the pulse wave, the PWM signal is in the high level. When the reset terminal (R) of the SR latch receives the pulse wave, the PWM signal is in the low level. Obviously, the constant on-time Ton1 or Ton2 may be selectively chosen to control the first constant current source (Ion1) or the second constant current source (Ion2) to charge the capacitor (Con). When the constant on-time Ton1 is selected, the frequency of the PWM signal is lower. When the constant on-time Ton2 is selected, the frequency of the PWM signal is higher. Therefore, the DC to DC converter in the constant on-time mode may adjust the operating frequency of the PWM signal according to the DC output voltage (Vout).

Figure 12:
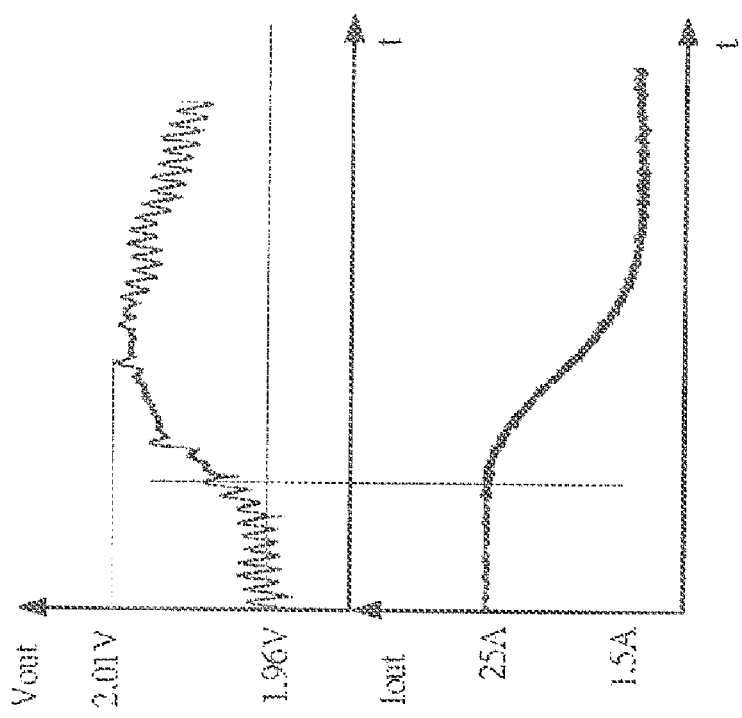
FIG. 12 is a schematic diagram showing the DC to DC converter in the constant on-time mode in the embodiment of the invention.

As shown in FIG. 12, according to the third embodiment of the invention, if the operating frequency of the PWM signal of the DC to DC converter in the constant on-time mode is 276 KHz, and the DC output voltage (Vout) in the steady state is 1.96V, when the output current decreases to 1.5 A from 25 A, the PWM signal is adjusted to the second frequency (342 KHz) to increase the transient DC output voltage (Vout) to 2.01V. That is, the overshoot voltage is 50 mV. Consequently, the overshoot voltage may be restrained effectively.

Figure 13:
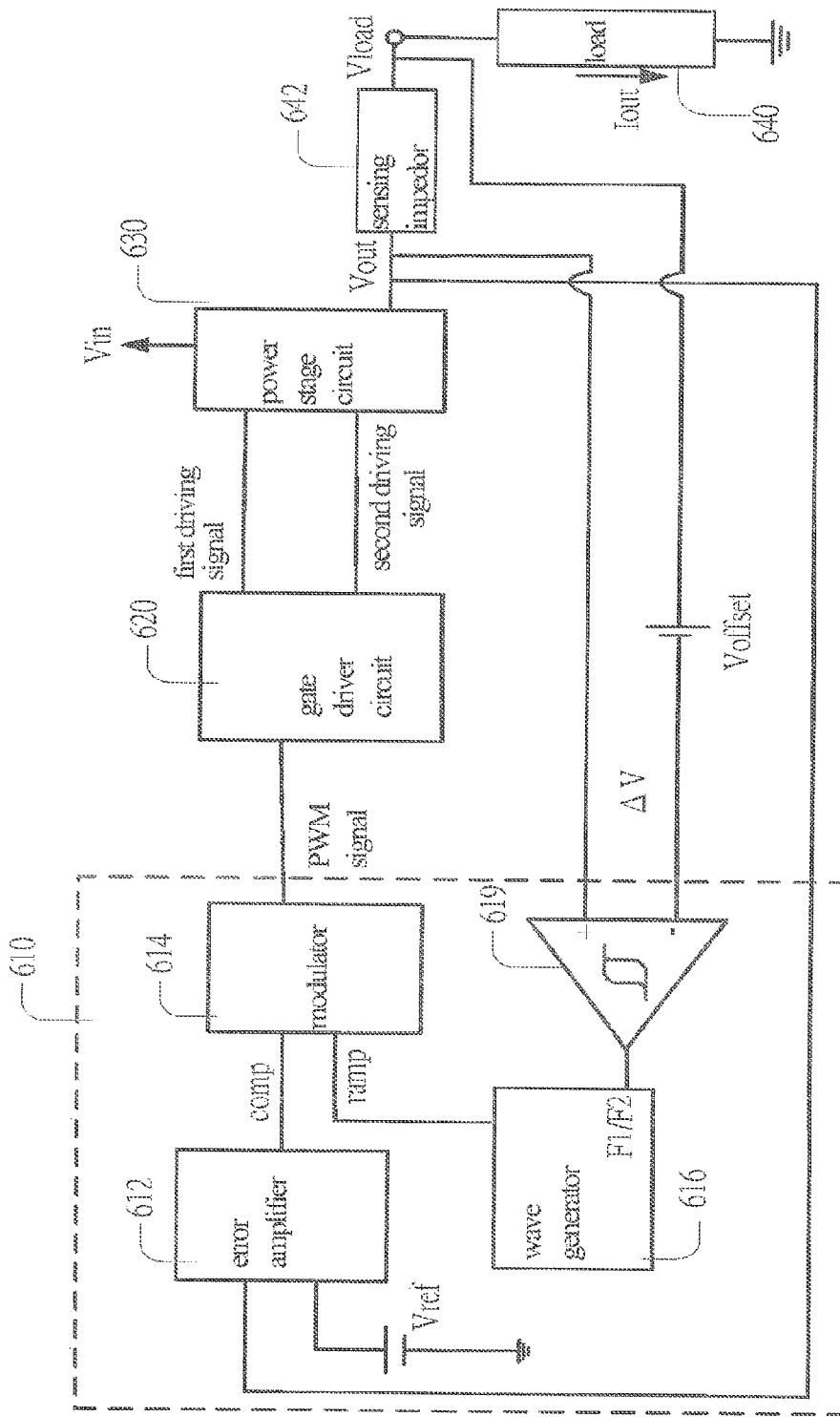
FIG. 13 is a schematic diagram showing the DC to DC converter in the voltage mode.

The DC output voltage (Vout) may be used to adjust the frequency of the PWM signal. Additionally, a skilled person in the art also may determine the overshoot according to the change of the output current (Iout) and reduce the overshoot voltage. FIG. 13 is a schematic diagram showing the DC to DC converter in the voltage mode. The DC to DC converter in the voltage mode includes a control circuit 610, a gate driver circuit 620, a power stage circuit 630, an offset voltage (Voffset), a sensing impedor 642, and a load 640. The control circuit 610 includes an error amplifier 612, a modulator 614, a signal generator 616, and a hysteresis comparator 619.

The error amplifier 612 receives the DC output voltage (Vout) and a reference voltage (Vref), and the error amplifier 612 may compare the DC output voltage (Vout) with the reference voltage (Vref) to generate a compensation signal (comp) to the modulator 614.

In addition, the signal generator 616 may selectively output the sawtooth waveform signal (ramp) with the first frequency (F1) or the second frequency (F2) to the modulator 614 to make the modulator 614 generate the PWM signal according to the compensation signal (comp) and the sawtooth waveform signal (ramp).

According to this embodiment, the sensing impedor 642 may be inductive impedance. When the output current (Iout) decreases rapidly, the loading voltage (Vload) in the load terminal 640 decreases rapidly. At that moment, the DC output voltage (Vout) may not change immediately due to the impedance effect of the sensing impedor 642. Therefore, the sensing voltage ($\Delta V$) is generated on the sensing impedor 642.

When the sensing voltage ($\Delta V$) is higher than the offset voltage (Voffset), it means the overshoot happens. The hysteresis comparator 619 may control the signal generator 616 to change from the first frequency (F1) to the second frequency (F2). That is, when the sensing voltage ($\Delta V$) is quite low, the hysteresis comparator 619 may output the first level signal to the signal generator 616 to make the signal generator 616 output the sawtooth waveform signal (ramp) with the first frequency (F1) to the modulator 614. On the contrary, when the output current (Iout) decreases rapidly to make the result obtained by the sensing voltage ($\Delta V$) minus the offset voltage (Voffset) reach a level change point of the hysteresis comparator 619, the hysteresis comparator 619 may output the second level signal to the signal generator 616 to make the signal generator 616 output the sawtooth waveform signal (ramp) with the second frequency (F2) to the modulator 614.

Therefore, the invention is used for monitoring the DC output voltage (Vout) continuously. When the DC output voltage (Vout) higher than the first threshold voltage (Vth1) (such as 1.03 times of the DC output voltage (Vout) in the steady state), it means that the DC to DC converter has the overshoot. At that moment, the control circuit may increase the operating frequency of the PWM signal. Consequently, the switching speeds of the upper power transistor and the lower power transistor are increased to restrain the overshoot voltage. When the DC output voltage (Vout) is lower than the first threshold voltage (Vth1) (such as 1.03 times of the DC output voltage (Vout) in the steady state), it means that the DC to DC converter goes back to the steady state soon. At that moment, the control circuit controls the PWM signal to restore to the normal operating frequency.

In addition, in the three embodiments, the comparator 618, 718, 818 may be the hysteresis comparators to avoid the interference of the DC output voltage (Vout), and make the DC to DC converter operate more stably.

Although the present invention has been described in considerable detail with reference to certain preferred embodiments thereof, the disclosure is not for limiting the scope of the invention. Persons having ordinary skill in the art may make various modifications and changes without departing from the scope and spirit of the invention. Therefore, the scope of the appended claims should not be limited to the description of the preferred embodiments described above.

What is claimed is:

1. A direct current (DC) to DC converter comprising:
a control circuit receiving and comparing a DC output voltage, wherein when the DC output voltage lower than a first threshold voltage, the control circuit outputs a pulse width modulation (PWM) signal with a first frequency, when the DC output voltage higher than the first threshold voltage, the control circuit outputs the PWM signal with a second frequency, and the second frequency is higher than the first frequency, the control circuit comprises:
an error amplifier receiving the DC output voltage and a reference voltage for generating a compensation signal;
a comparator receiving the first threshold voltage and the DC output voltage, wherein when the DC output voltage is lower than the first threshold voltage, the comparator outputs a first level signal, and when the DC output voltage is higher than the first threshold voltage, the comparator outputs a second level signal;
a signal generator connected to the comparator, wherein when the comparator outputs the first level signal, the signal generator outputs a wave signal with the first frequency, and when the comparator outputs the second level signal, the signal generator outputs the wave signal with the second frequency; and
a modulator receiving the compensation signal and the wave signal to generate the PWM signal;
a gate driver circuit receiving the PWM signal and converting the PWM signal to a first driving signal and a second driving signal; and
a power stage circuit converting a DC input voltage to the DC output voltage according to the first driving signal and the second driving signal.

2. The DC to DC converter according to claim 1, wherein the wave signal is a sawtooth waveform signal or a triangle waveform signal.

3. The DC to DC converter according to claim 1, wherein the comparator is a hysteresis comparator.

4. A direct current (DC) to DC converter comprising:
a control circuit receiving and comparing a DC output voltage, wherein when the DC output voltage lower than a first threshold voltage, the control circuit outputs a pulse width modulation (PWM) signal with a first frequency, when the DC output voltage higher than the first threshold voltage, the control circuit outputs the PWM signal with a second frequency, and the second frequency is higher than the first frequency, the control circuit comprises:
- an error amplifier receiving the DC output voltage and a reference voltage and generating a compensation signal;
- a comparator receiving the first threshold voltage and the DC output voltage, wherein when the DC output voltage is lower than the first threshold voltage, the comparator output s a first level signal, and when the DC output voltage is higher than the first threshold voltage, the comparator outputs a second level signal;
- a signal generator connected to the comparator, wherein when the comparator outputs the first level signal, the signal generator outputs a wave signal with the first frequency and a clock signal, and when the comparator outputs the second level signal, the signal generator outputs the wave signal with the second frequency and the clock signal;
- a current sensing amplifier for detecting a current in a power stage circuit and converting the current to a sensing signal;
- an adder superposing the sensing signal to the wave signal to be a sum signal;
- a PWM comparator receiving the compensation signal and the sum signal and generating a pulse wave signal; and
- a set-reset (SR) latch generating the PWM signal according to the pulse wave signal and the clock signal;

a gate driver circuit receiving the PWM signal and converting the PWM signal to a first driving signal and a second driving signal; and the power stage circuit converting a DC input voltage to the DC output voltage according to the first driving signal and the second driving signal.

5. The DC to DC converter according to claim 4, wherein the wave signal is a sawtooth waveform signal or a triangle waveform signal.

6. The DC to DC converter according to claim 4, wherein the comparator is a hysteresis comparator.

7. A direct current (DC) to DC converter comprising:
- a control circuit receiving and comparing a DC output voltage, wherein when the DC output voltage lower than a first threshold voltage, the control circuit outputs a pulse width modulation (PWM) signal with a first frequency, when the DC output voltage higher than the first threshold voltage, the control circuit outputs the PWM signal with a second frequency, and the second frequency is higher than the first frequency, the control circuit comprises:
  - a loop comparator receiving the DC output voltage and a reference voltage and generating a first pulse wave;
  - a comparator receiving the first threshold voltage and the DC output voltage, wherein when the DC output voltage is lower than the first threshold voltage, the comparator outputs a first level signal, and when the DC output voltage is higher than the first threshold voltage, the comparator outputs a second level signal;
  - a timer, wherein when the comparator outputs the first level signal, the timer generates a second pulse wave, the time difference between the first pulse wave and the second pulse wave is a first starting time, when the comparator outputs the second level signal, the timer generates a third pulse wave, the time difference between the first pulse wave and the third pulse wave is a second starting time, and the first starting time is longer than the second starting time; and
  - a SR latch generating the PWM signal according to the first pulse wave and the second pulse wave or generating the PWM signal according to the first pulse wave and the third pulse wave;
- a gate driver circuit receiving the PWM signal and converting the PWM signal to a first driving signal and a second driving signal; and
- a power stage circuit converting a DC input voltage to the DC output voltage according to the first driving signal and the second driving signal.

8. The DC to DC converter according to claim 7, wherein the timer uses a first constant current source and a second constant current source to charge the capacitor to obtain the first starting time and the second starting time, and the first constant current source is lower than the second constant current source.

9. The DC to DC converter according to claim 7, wherein the comparator is a hysteresis comparator.

* * * * *